United States Patent
Ecker

(10) Patent No.: US 12,488,484 B2
(45) Date of Patent: Dec. 2, 2025

(54) DETECTION OF OBJECTS LOCATED CLOSER THAN A MINIMAL DISTANCE OF HARDWARE STEREO SYSTEMS

(71) Applicant: INUITIVE LTD., Raanana (IL)

(72) Inventor: Ady Ecker, Ness Ziona (IL)

(73) Assignee: INUITIVE LTD., Raanana (IL)

( * ) Notice: Subject to any disclaimer, the term of this patent is extended or adjusted under 35 U.S.C. 154(b) by 424 days.

(21) Appl. No.: 18/164,754

(22) Filed: Feb. 6, 2023

(65) Prior Publication Data

US 2024/0273746 A1     Aug. 15, 2024

(51) Int. Cl.
| | |
|---|---|
| G06T 7/246 | (2017.01) |
| G06T 1/20 | (2006.01) |
| G06T 5/77 | (2024.01) |
| G06T 7/593 | (2017.01) |
| G06T 7/73 | (2017.01) |
| G06V 10/74 | (2022.01) |
| G06V 10/75 | (2022.01) |
| H04N 13/106 | (2018.01) |

(52) U.S. Cl.
CPC ............... *G06T 7/593* (2017.01); *G06T 5/77* (2024.01); *G06V 10/751* (2022.01); *G06V 10/761* (2022.01); *H04N 13/106* (2018.05); *G06T 2207/20036* (2013.01); *G06V 2201/07* (2022.01)

(58) Field of Classification Search
CPC . G06T 7/593; G06T 5/77; G06T 2207/20036; G06T 7/246; G06T 1/20; G06T 7/73; G06T 2207/10012; G06V 10/751; G06V 10/761; G06V 2201/07; H04N 13/106; H04N 2013/0081
See application file for complete search history.

(56) References Cited

FOREIGN PATENT DOCUMENTS

| | | | | |
|---|---|---|---|---|
| CN | 108243623 B | * | 6/2022 | ............... G06T 7/00 |
| EP | 2854106 B1 | * | 2/2017 | ............. G06T 7/593 |

OTHER PUBLICATIONS

PatchMatch Stereo—Stereo Matching with Slanted Support Windows by M. Bleyer, C. Rhemann, and C. Rother, (2011) retrievable at <http://www.bmva.org/bmvc/2011/proceedings/paper14/paper14.pdf>, pp. 1-9.

(Continued)

*Primary Examiner* — Vu Le
*Assistant Examiner* — Lei Zhao
(74) *Attorney, Agent, or Firm* — FisherBroyles, LLP; Roger L. Browdy; Ronni S. Jillions

(57) ABSTRACT

A method for use in a stereoscopic image generating system, wherein the image generating system comprises a hardware module associated with at least one pair of image capturing devices, at least one memory means and at least one processor, wherein information retrieved from the capturing devices is processed by the at least one processor, which is configured to implement a hardware module stereo algorithm for identifying objects included in the captured scene at a distance that is equal to or greater than a minimal distance defined by the geometry and disparity range of said hardware module, and wherein the at least one processor is further configured to implement a software stereo algorithm adapted to identify objects included in the captured scene at a distance that is less than the minimal distance required for detecting objects by the hardware module stereo algorithm.

11 Claims, 7 Drawing Sheets

(56) References Cited

OTHER PUBLICATIONS

Parallel-Friendly Patch Match Based on Jump Flooding by P. Yu, X. Yang, and L. Chen, Advances on Digital Television and Wireless Multimedia Communications pp. 15-21 (2012).

Massively Parallel Multiview Stereopsis by Surface Normal Diffusion by S. Galliani et al. Computer Vision Foundation, pp. 873-881 (2015).

Weighted Semi-Global Matching and Center Symmetric Census Transform for Robust Driver Assistance Spangenberg, R., Langner, T., Rojas, R., vol. 8048 of Lecture Notes in Computer Science. Springer Berlin Heidelberg pp. 34-41 (2013).

* cited by examiner

LEFT IMAGE　　　　　　　　RIGHT IMAGE

LEFT IMAGE　　　　　　　　RIGHT IMAGE

LEFT IMAGE　　　　　　　　RIGHT IMAGE

LEFT IMAGE　　　　　　　　RIGHT IMAGE

LEFT IMAGE   RIGHT IMAGE

DETECTION OF OBJECTS LOCATED CLOSER THAN A MINIMAL DISTANCE OF HARDWARE STEREO SYSTEMS

TECHNICAL FIELD

The present disclosure generally relates to methods for using optical devices, and more particularly, to methods that enable stereoscopic reconstruction of three-dimensional images.

BACKGROUND

A stereoscopic camera arrangement is an apparatus made of two camera units, assembled in a stereoscopic module. Stereoscopy is a technique for creating or enhancing the illusion of depth in an image derived from a number of images of the same scene, by means of stereopsis. In other words, it is the impression of depth that is perceived when a scene is viewed with both eyes by someone having normal binocular vision, which is responsible for creating two slightly different images of the scene in the two eyes due to the eyes'/camera's different locations.

For carrying out depth calculation using rectified stereo images, the depth is calculated by the disparity that exists between the two images.

The depth to be detected, dictates a disparity range to be checked. In order to detect all objects that are present within a required depth range, the system must check every pixel in order to find the best disparity of all values for this range. This depth calculation process, especially when carried out under real time conditions, typically consumes quite a substantial amount of the processing device's available resources and it may require considerable CPU resources or dedicated hardware.

Hardware stereoscopic systems scan a fixed set of disparity values due to hardware limitations, wherein the stereo disparity in a camera can be found by using two 2D images taken at different positions and the correlation between the images can be used to create a depth image. These systems have a maximal disparity that corresponds to a minimal distance, for which closer objects cannot be detected.

In real life applications, e.g., in the field of robotics, it is common to encounter objects that are located closer to the hardware stereo arrangement than the minimal distance of the arrangement as dictated by the hardware used. For example, a robot might rotate and face a wall from a very close distance.

When an object is located closer to the stereo arrangement than the minimal distance, typical hardware stereo arrangements assign the disparity of the lowest cost among the possible disparities between the minimal (usually 0) and the maximal disparity. In many cases this assignment can be filtered out, for example when a left-right check test fails, or where the cost of the matching between the left and right windows is relatively high compared to correct matches. However, spurious depth matches are difficult to eliminate completely. In such a case, close objects appear on the depth map as "flying pixels" at a larger distance than they truly are. When these "flying pixels" remain in the depth map, they may confuse the robot. When "flying pixels" are filtered from the depth map, e.g., by implementing a post-processing algorithm, there would be no indication of the close object that the robot may collide with.

This problem is even more severe for a stereo arrangement having a wide baseline, designed to detect remote objects, since the minimal distance associated with such an arrangement is larger compared to narrow baseline systems.

A simple solution to the problem is to down-sample the input images. However, this may be only a partial solution. First, it reduces the minimal distance by the down-sampling factor. For example, for an HD image with 1280 pixels per row, a disparity scanning range of 144, down-sampling by a factor of 2 is similar to a disparity scanning range of 288. Whether an object can appear in both cameras of the stereo arrangement, depends on their shared field of view. For wide field of view cameras, small baseline, or cameras tilted towards each other, close objects with higher disparity may appear and not detected. Second, low resolution images blur the texture. For an active stereo arrangement with a pattern projector, the dots of the pattern may become blurred or disappear in a low-resolution image, leading to mismatches.

Another solution to the problem may be using software solutions which can check for matching in an unlimited range of disparities. However, the disadvantages of this solution are that checking for matches over a large range of disparities can be slow, i.e., unsuited for real-time applications, and/or may require an expensive processor or a GPU.

On the other hand, there exist software stereo algorithms that do not check the full range of possible disparities. Such an example is the publication "PatchMatch Stereo—Stereo Matching with Slanted Support Windows" by M. BLEYER, C. RHEMANN, and C. ROTHER, retrievable at http://www.bmva.org/bmvc/2011/proceedings/paper14/paper14.pdf.

Such algorithms are directed to try finding the disparity at a pixel by checking a small sample of possible disparities. Unlike algorithms that scan the entire range of disparities, these algorithms are fast, but on the other hand, they do not guarantee that the minimal cost disparity is found. In fact, they tend to miss small objects flying in the air, or objects occluded behind other objects that appear in the air although they are not flying.

Therefore, there is a need for a method that on one hand enables scanning a complete range of disparities in order to guarantee that no disparity in this range would be missed, while on the other hand enables detecting close objects associated with disparities that are larger than the disparities' range that are scanned individually.

Also, it is known that when scanning a large range of disparities, it is possible to use a hardware system to scan each subrange separately. Since outliers appear when the value of the real disparity is outside the range being checked, this approach requires going through a complicated merging and cleaning phase.

The current solutions used in the art to overcome the above hurdles, are:
1. Addressing the problem by implementing other means such as reducing the value of the baseline, using proximity sensors, etc.
2. Using low-resolution images to increase the disparity range. However, this approach is not based on using the original high-resolution images, but images in which the details level is lower and so is the stereo accuracy.
3. Implementing software methods can either include scanning a large range of disparities systematically, or alternatively, using a method like PatchMatch-stereo that does not scan the entire range and has no guarantee as to the results that will be thus obtained.

These methods, as explained above, may provide good results but still consume considerable part of the available system resources.

SUMMARY OF THE DISCLOSURE

The disclosure may be summarized by referring to the appended claims.

It is an object of the present disclosure to provide a method for combining results obtained while operating a hardware module stereo algorithm and a software stereo algorithm onto an image of a scene captured by a pair of image capturing devices.

It is another object of the present disclosure to provide a method for generating a combined depth map based on combining objects included in the captured scene that were detected by a hardware stereo module algorithm at a distance that is equal to or greater than its minimal detecting distance, and objects detected by a software stereo algorithm at a distance that is less than the minimal distance at which objects are detectable by the hardware module stereo algorithm.

It is another object of the present disclosure to provide a device and a method for in which results obtained by using a hardware module with results obtained by using a software stereo algorithm specifically designed to complement the hardware module stereo algorithm implemented for detection of close objects, with acceptable success probability of close objects detection.

Other objects of the present invention will become apparent from the following description.

Briefly, the main idea of the present disclosure may be summarized as follows.

The present solution relates among others to using a hardware stereo algorithm which is configured to scan every disparity within a disparity range and is adapted to provide guaranteed results in that disparity range.

By the present solution, a software stereo algorithm is added to the system, wherein that software stereo algorithm is configured to use a random sampling and propagation of disparities, but without providing to the user with any guarantee that the correct disparity has been found.

Previous probabilistic methods that were proposed in the prior art (e.g., PatchMatch Stereo), use repeated passes over the image pixels and add random search at each step to decreases the probability of missing correct disparities.

As opposed to that, the present solution reduces the number of passes (e.g., two passes) and does not apply random search at each propagation step, thereby improving the operational running time.

Thus, according to the present invention, a comprehensive solution is provided, by which for most of the depth range reliable results are obtained by applying a hardware stereo algorithm, whereas closely located objects need to be detected, it is done through the use of a software stereo algorithm that complements the hardware stereo algorithm, with acceptable success probability for close objects detection. This latter software stereo algorithm relies preferably on providing a depth indication rather than the exact depth at every pixel.

Moreover, it should be noted that the method proposed by the present invention is not merely a combination of a hardware algorithm with a PatchMatch stereo algorithm. The present software stereo algorithm, which is a crucial element of the instant invention is specifically designed so as to complement the hardware algorithm to enable detecting close objects, thereby providing a simpler and faster solution than can be obtained by an algorithm such as the PatchMatch stereo algorithm, with acceptable success probability for close objects detection.

Thus, according to an embodiment of the present invention there is provided a method for use in a stereoscopic image generating system, wherein the image generating system comprises a hardware module that is associated with at least one pair of image capturing devices, at least one memory means and at least one processor, wherein information retrieved from the capturing devices is processed by the at least one processor, which is configured to implement a hardware module stereo algorithm for identifying objects included in the captured scene at a distance that is equal to or greater than a minimal distance defined by geometry and disparity range of the hardware module, wherein the at least one processor is further configured to implement a software stereo algorithm adapted to identify objects included in the captured scene at a distance that is less than the minimal distance required for detecting objects by the hardware module stereo algorithm.

The term "stereoscopic" (or "stereo") as used herein throughout the specification and claims, is used typically to denote a combination derived from two or more images, each taken by a different image capturing means, which are combined to yield a perception of three-dimensional depth. However, it should be understood that the scope of the present invention is not restricted to deriving a stereoscopic image from two sources, but also encompasses generating an image derived from three or more image capturing means.

The term "image" as used herein throughout the specification and claims, is used to denote a visual perception being depicted or recorded by an artifact (a device), including but not limited to, a two-dimensional picture, a video stream, a frame belonging to a video stream, and the like.

The term "detecting object" and/or "detected object" as used herein throughout the specification and claims, is used to denote detecting values of pixels in a depth map or in a disparity map, wherein these pixels are associated with an object, being the detected object.

The term "minimal distance" as used herein throughout the specification and claims, is used to denote a distance which is the smallest distance defined by the geometry and disparity range of the hardware module, and wherein the hardware module is able to detect only objects present within a captured scene that are located at a distance equal to or greater than that minimum distance from the hardware module, or from the pair of image capturing devices, as the case may be.

According to another embodiment, the method is further configured to generate a combined depth map based on combining objects located at a distance that is equal to or greater than said minimal distance identifiable by the hardware module stereo algorithm, together with objects located at a distance that is less than said minimal distance that are identifiable by the software stereo algorithm.

In accordance with another embodiment, the method is further configured to generate an indication (e.g., an alarm) upon detecting objects included in the captured scene at a distance that is less than the minimal distance.

By yet another embodiment, the method is further configured to eliminate from the information received from the image capturing devices, values of pixels associated with objects that are located in the captured scene at a distance that is less than the minimal distance. When the object is located closer than the minimal distance, using the hardware module stereo algorithm might produce false depth values, thus, objects that are located at a distance less than the minimal distance may be eliminated so that they will not be included in the depth map (or disparity map) by using the software stereo algorithm (if the purpose is to clean the depth map, not to report the close objects). The reason that someone may want to receive only an indication (e.g., an alarm) that an object is located closer than the minimal distance, instead of the actual distance of the software module is that the software stereo algorithm has no guarantee. It is likely to find some close objects but not their precise distance. In other words, the software stereo algorithm may not detect all the pixels comprised in the close objects, or may assign imprecise disparities to some of the pixels belonging to these close objects, yet, its output is likely to suffice at least to provide a warning as to the presence of close objects.

Moreover, the hardware module stereo algorithm produces invalid disparities and flying pixels for the close objects. According to an embodiment of the invention the method provided may be used to clean flying pixels that correspond to close object. It would not eliminate very large disparities, since the hardware module algorithm does not generate very large disparities.

In accordance with still another embodiment, the hardware module is configured to scan a full range of disparities, ensuring that all objects located within the scene at a distance that is equal to or greater than the minimal distance, are detected.

Since the software stereo algorithm is associated with some probability of failure, it is possible that it detects different disparities than the hardware module stereo algorithm (either within the range of the hardware module scan or above it). If the software stereo algorithm identifies an erroneous match within the range that exceeds the maximal disparity value, it would be possible to carry out a verification step in order to decide which of the software stereo algorithm and the hardware module stereo algorithm has a lower cost. Such a step will ensure that the identifiable disparity within the operative range of the hardware module stereo algorithm will always be found.

According to another embodiment, the software stereo algorithm is configured to detect the distance at which objects are located from the hardware module and/or the pair of image capturing devices, wherein in the case that the distance is equal to or greater than the minimal distance, depth results will be determined by using the results retrieved by the hardware module stereo algorithm, and in the case that the detected distance is less than the minimal distance, the depth results will be determined by using the results retrieved by the software stereo algorithm According to another embodiment, when implemented by the software stereo algorithm, the method provided, comprises an initialization phase that comprises the steps of:
(i) receiving at least one pair of images from the two image capturing devices, storing the information derived from the received images by columns and rows and retrieving information contained in pixels comprised in these rows/columns;
(ii) assigning a small set of initial random disparities to each of the columns, wherein the same set of initial random disparities is assigned to all pixels that belong to a single column;
(iii) determining a permutation index i for each column c by using a relationship i=P[c mod S], where S is the permutation size and P is a random permutation of the numbers 0, . . . , S−1, and disparity samples for that column c are: i, i+S, i+2S, . . . until the edge of the image is reached;

(iv) computing matching costs for each pixel located at the first row of the captured image for its initial set of random disparities (i.e., a cost for each disparity in the set), wherein the disparity that corresponds to the lowest score is stored at the at least one memory means. However, it should be noted that a plurality of costs is preferably stored rather than computing and storing only the lowest score, as for computing the matching costs along the columns with the sliding window technique that will be described later, a number of scores are required, since the pixel below the pixel for which the computation is carried out, may have a different best disparity.

Preferably, the disparities which have already been tested are store in a dictionary at the at least one memory means while providing a fast access (e.g., by a hash function), to these stored disparities; and
(v) completing the computation for all image rows included in the captured image. The procedure carried out in this step, computes for each pixel the set of matching costs for the randomly sampled disparities that was sampled for the column of the pixel, and stores the minimum cost and corresponding disparity. The only change from the procedure carried out for the first row is, that for subsequent rows the procedure is carried out by using a sliding window technique.

As will be appreciated by those skilled in the art, the five steps described above relate to the initialization phase. From the initial set of costs computed for the first row, for the selected set of initial disparities provided per pixel, the cost of the pixel below a given pixel can be computed by sliding the matching window one pixel down. Adopting this option is a cheaper method than computing the cost of the entire window. After the cost is found for the disparities in the set examined for each pixel, the disparity having the lowest cost for each pixel in the image is stored.

In accordance with still another embodiment, following the initialization phase, the method comprises a phase of calculating lowest-found cost and best-found disparity, wherein the phase comprises the steps of:
1) making a number of passes over the image in order to update for each pixel its best-found disparity with a respective lowest-found cost. Preferably, two passes are made. These passes may be for example two snake-shape passes over the image, wherein a first snake-shape pass may be carried out from the captured image top-left corner, along the image rows, to the bottom row, and a second snake-shape pass may be carried out from the captured image bottom-right corner to the captured image top row. Alternatively, the order of these passes may be reversed, in which case the first snake-shape pass will begin from the captured image bottom-right corner to the captured image top row. Additionally, the number of the passes may be changed in order to achieve a different quality outcome on expense of running time. Moreover, other types of passes are possible. For example, raster-scan (not in an alternating shape such as a snake-like pass), pass in reversed direction, and parallel propagation pass (as described for example in the papers "Parallel-Friendly Patch Match Based on Jump Flooding" by P. YU, X. YANG, and L. CHEN, and "Massively Parallel Multi-view Stereopsis by Surface Normal Diffusion" by S. GALLIANI, K. LASINGER, and K. SCHINDLER).
2) for each pass, comparing the cost of each given pixel's current best disparity, with two proposed disparities, one of which is the currently best-found disparity of the given pixel row's neighbor whereas the other is that of its column's neighbor. For example, in case that two snake-shape passes are performed (any shape and number of passes may be implemented), the neighbors are pixels located adjacent to the given pixel in the direction of the snake-pass, i.e., in the direction of the already processed pixels during the pass. By carrying out this alternative, a propagation process is carried out (each snake-pass is a propagation process), and the disparity values associated with each pixel depends on the value of a preceding pixel in the snake-shape pass; and 3) evaluating the cost of disparities d+1 and d−1, where d is current disparity having lowest cost, and updating the current best disparity and current lowest cost if the cost is smaller than the current best cost of a given pixel.

By yet another embodiment, the method provided comprises a phase of combining disparity maps retrieved while processing the information received from the image capturing devices to enable detection of objects included in the captured scene at the distance that is equal to or greater than the pre-defined minimal distance and the information received from applying the software stereo algorithm to enable detection of closer objects, wherein the phase comprises the steps of:

(a) initializing a combined depth map of the disparity obtained from processing the information received from the image capturing devices;

(b) identifying pixels in the combined depth map derived from the output of the software stereo algorithm, wherein the identified pixels have a disparity higher than a maximal disparity of the hardware module stereo algorithm;

(c) implementing morphological operations onto the combined depth map, so that each pixel in the image is adjusted based on values of other pixels located at its neighborhood, to eliminate small holes and remove small blobs from the captured image being processed;

(d) after eliminating small holes and removal of small blobs, setting the disparity of the image pixels to the disparity obtained from the software stereo algorithm;

(e) if the matching cost of the pixels set in step (d) is higher than a pre-defined threshold, their disparity is set to an invalid value;

(f) setting the disparity of pixels that were eliminated/removed by applying the morphological operations to an invalid disparity; and (g) generating a combined depth map.

In accordance with another embodiment, the combined depth map is applied as a full combined disparity map, or applied as a truncated map that matches disparity range of the hardware module's algorithm (i.e., where "flying pixels" are filtered out), or applied for generating an indication if a large number of close pixels is detected by the software stereo algorithm.

According to another embodiment, the method provided is adapted for use in the robotics field of technology.

BRIEF DESCRIPTION OF THE DRAWING

For a more complete understanding of the present invention, reference is now made to the following detailed description taken in conjunction with the accompanying drawing wherein:

FIG. 8C illustrates the disparity image obtained by using the software stereo algorithm, and FIG. 8D demonstrates the result obtained by combining the output of the hardware module stereo algorithm with the output of the software stereo algorithm.

DETAILED DESCRIPTION

Figure 1:
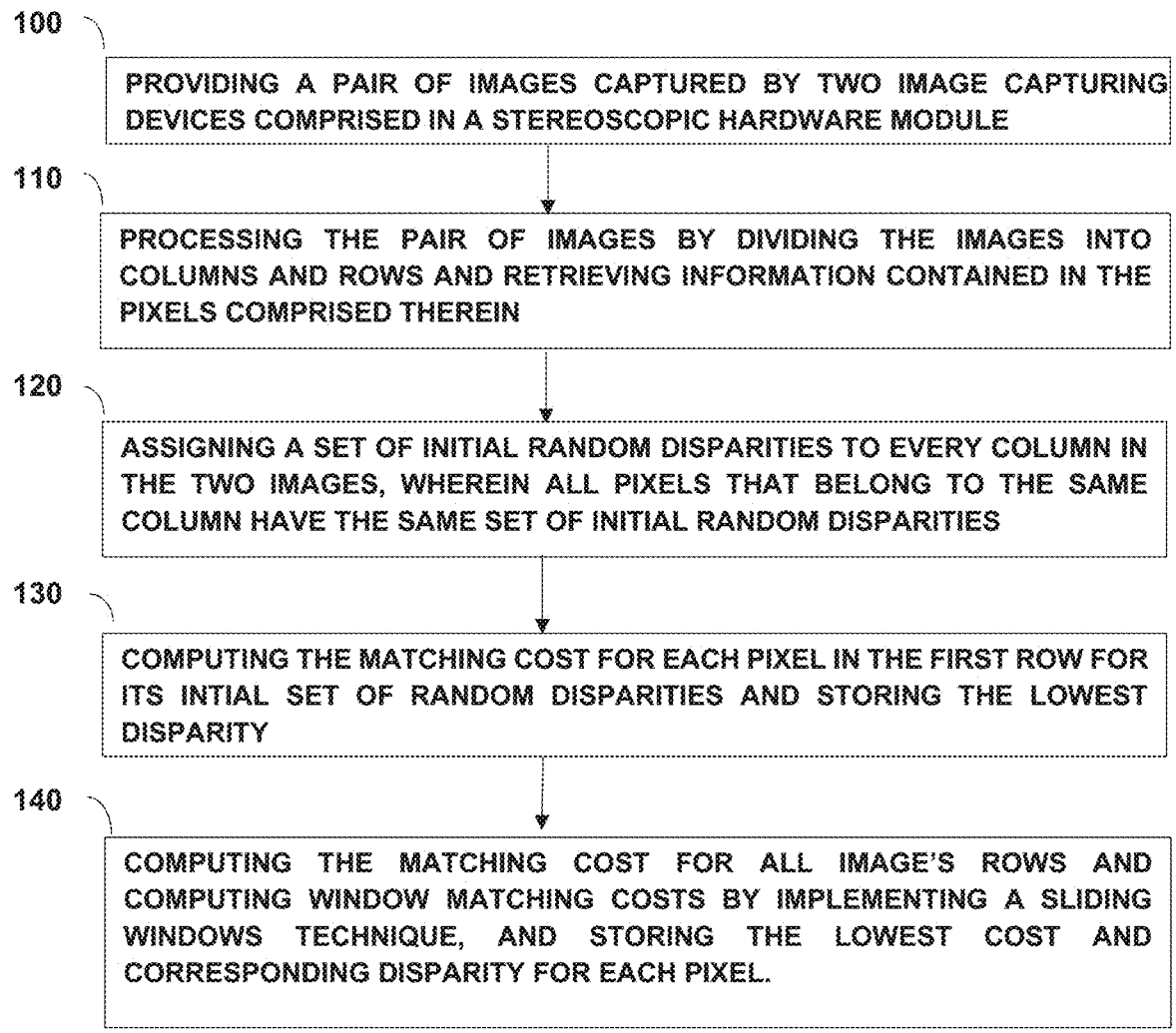
FIG. 1—is a flowchart illustrating an example of carrying out the initialization stage of a method construed in accordance with an embodiment of the present invention.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The solution provided by the present invention relies on a combination of a hardware module stereo algorithm and a software stereo algorithm, a combination which has the following characteristics:

1. The results of the hardware module stereo algorithm part of the combination are obtained by scanning a full range of disparities, to ensure that all objects located at a distance exceeding the minimum distance, are detected.

2. The software stereo algorithm is used to detect objects located at a short distance, objects which are not detectable by the hardware scan.

3. Close objects which are located at a short distance (e.g., at a distance shorter than the minimum distance), appear naturally larger in the images than remote objects of the same size due to the perspective projection, hence the probability of the software stereo algorithm to miss them, is relatively small.

4. The underlying idea of algorithms known in the art, such as for example the PatchMatch stereo algorithm, is to add complexity to the processing of the images in order to reduce the probability of misses. According to the present invention on the other hand the software stereo algorithm is used primarily only as a verification backup for detecting existence of close objects (having a large footprint), hence its processing is simplified.

5. The advantage of using the solution provided by the present invention is clearly demonstrated when implemented in certain technological fields such as robotics, where usually a presence warning (e.g., an indication) of close objects is more important than an accurate depth map of the close object. For example, when a small close object is occluded and appears flying in the image, the detection capabilities provided by the present invention might miss it, but still enable detection of the closer occluding object and issue a warning. In other words, the present solution does not aim to necessarily provide an accurate result at every pixel, but instead to enable a fast detection with a reasonable success probability.

The retrievable results from implementing the solution provided by the present invention, in addition to obtaining a stereo depth map, may be any one or more of the following options:

a. Invalidation of "flying pixels" received from operating the hardware module stereo algorithm of the solution, i.e., thereby, ignoring objects located at a closer distance than the minimum distance from the stereo cameras.

b. Generation of a general warning (e.g., existence indication) of objects located at a closer distance than the minimum distance from the stereo cameras, for example summing the number of pixels identified by the software stereo algorithm to belong to such objects located at a distance closer than the minimal distance.

c. Generation of a full depth map combining the results obtained from both the hardware module stereo algorithm and the software stereo algorithm.

The present solution that will be described hereinafter does not include the use of a fixed disparity range algorithm (e.g., the hardware algorithm) on low-resolution images, may not cover the entire range of disparities, or may blur (or eliminate) the pattern of an active projector. However, it should be noted that using low-resolution images may speed up the method described.

In short, the present solution relates to a method for use in a stereoscopic image generating system, comprising a hardware module that comprises at least one pair of image capturing devices (e.g., cameras), at least one memory means and at least one processor. The information retrieved from the capturing devices is processed by the at least one processor, which is configured to detect objects included in the captured scene at a distance that is equal to or greater than a minimal distance defined from the hardware module geometry. In addition, the at least one processor is further configured to implement a software stereo algorithm which is adapted to detect objects included in the captured scene at a distance that is less than a minimal distance defined by the hardware module characteristics. Preferably, the software stereo algorithm is configured to detect the close objects with high probability.

The following non-limiting example describes a method of implementing the software stereo algorithm. It should be noted that different variants from those described hereinbelow may be used (for example, replacing the window matching cost function), all without departing from the scope of the present invention.

Cost Term of the Window Matching

In accordance with the example described herein, a 2-bit center-symmetric census is computed at each pixel, where the center-symmetric census is described for example in "Weighted Semi-Global Matching and Center-Symmetric Census Transform for Robust Driver Assistance" by R. SPANGENBERG, T. LANGER, and S. ROJAS. For an image I, at pixel i,j, the first bit of the center-symmetric census transform is equal to 1 if $I_{i,j-1} > I_{i,j+1}$ and is equal to 0 otherwise. The second bit is equal to 1 if $I_{i-1,j} > I_{i+1,j}$ and is equal to 0 otherwise.

As is common with bit features, the cost of comparing two windows from the left and right images at a given disparity is the sum of their hamming-distance (XOR) of their census features for all pixels within these windows. It is possible to use other common distance functions between the windows, for example the Sam of Absolute Difference; (SAD) cost, or any combination thereof.

Initialization

FIG. 1 illustrates an example of carrying out the initialization phase of a method construed in accordance with an embodiment of the present invention.

First, a pair of images is received from the two image capturing devices comprised in the hardware module (step 100), and processed by diving the images into columns and rows and retrieving information contained in the pixels comprised in these images' rows/columns (step 110).

Next, a small set of initial random disparities is assigned to every column, wherein the same set of initial random disparities is assigned to all pixels that belong to the same column (step 120).

To ensure an even sampling, let us determine a permutation size S, and a random permutation P of the numbers 0, . . . , S−1. For each column c, its permutation index, i, is determined by the relationship i=P[c mod S]. The disparity samples for column c are i, i+S, i+2S, . . . until the edge of the image is hit, or in other words, until i−k*S<0, i.e., until the pixel having the disparity shift at the right image hits the image boundary (while ignoring the window size which also utilizes a few pixels). In this scheme, more disparities are assigned for the right columns of the left image, than the left columns of the left image.

In the next step of the initialization phase, the matching cost for each pixel in the first row is computed for its initial set of random disparities. The lowest score and the lowest disparity are stored in the at least one memory means (step 130). Also, the disparities which have already been tested are stored in a dictionary at the at least one memory means while providing a fast access by a hash function to these stored disparities and their costs.

The final step of the initialization phase is completing the computation for all image rows (step 140), where the procedure carried out in this step, is used to compute for each pixel, the set of matching costs for the randomly sampled disparities that was sampled for the column of the pixel, and to store the minimum cost and corresponding disparity. Since the random disparities are assigned to the columns, one may compute the window matching costs efficiently by the technique of sliding windows, where the cost difference between a pixel and the one below is computed by subtracting the cost of the top row of the window and adding the cost of the bottom window row as demonstrated in FIGS. 4 and 5.

Calculation of the Best-Found Window Matching Cost and Disparity

Figure 2:
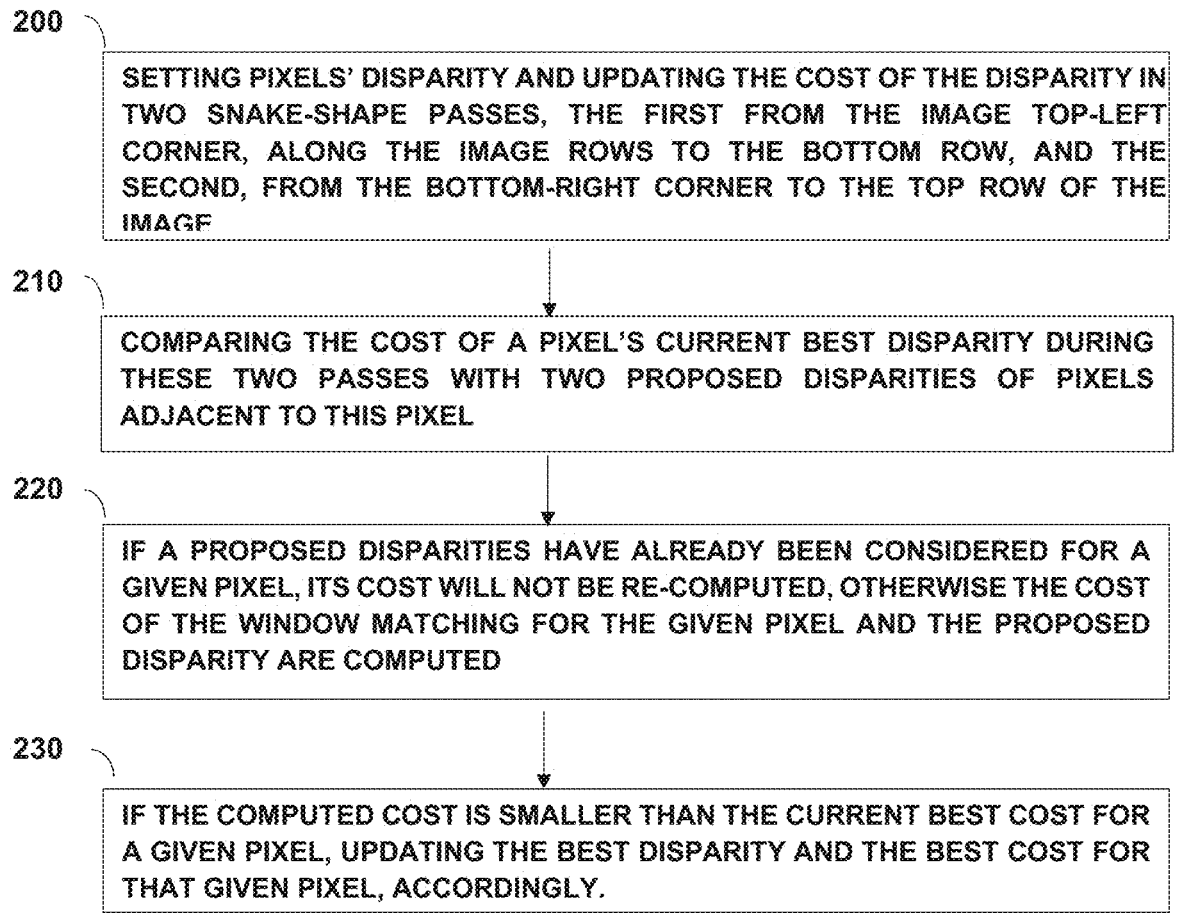
FIG. 2—is a flowchart illustrating an example of calculating the best window matching cost and the best disparity for every pixel in the captured images construed in accordance with an embodiment of the present invention.

The calculation of the best window matching cost and the best disparity for each pixel of this example is demonstrated in FIG. 2. First, a disparity is set in the initialization phase and is then updated while making two snake-shape passes over the pixels. A first snake-shape pass from the top-left corner, along the image rows, to the bottom row and an updated second snake-shape pass from the bottom-right corner to the top row of the image (step 200).

During these two passes, when each pixel is reached, the cost of a pixel's current best disparity during these two passes, is compared with the cost of the two proposed disparities (step 210). One of these two proposed disparities is a disparity of its row neighbor and the other is that of its column neighbor. In other words, the propagation uses the two neighbors whose values were updated in the snake-shape pass. For example, if a pass starts at the top-left corner, the value associated with the pixel above will be used, as well as that of the left pixel on a row in the scan right, and the right in a row that scan left, so in fact it is in the opposite direction of the snake. If the proposed disparities have already been considered for a given pixel, there is no need to compute again their cost, and their cost can be easily verified when the previous computations are stored in a dictionary. Otherwise, the cost of window matching for this pixel and the proposed disparity is computed. If it is smaller than the current best cost, the best disparity and best cost is updated for that pixel (step 220).

There are several possible ways that may be used to compute the window matching cost efficiently. The simplest way would be a brute-force summation over the matched windows. Another option is to retrieve the cost of the neighbor from memory, and then use a sliding window technique. This latter option requires summation over two rows or columns of the window rather than over the entire window. If the cost for the disparity to check exists for 3 specific neighbors, the computation can be made even faster with summation at 4 pixels, using integral image techniques. However, this would require memory access to the data structure and may not always be the fastest way.

Figure 4:
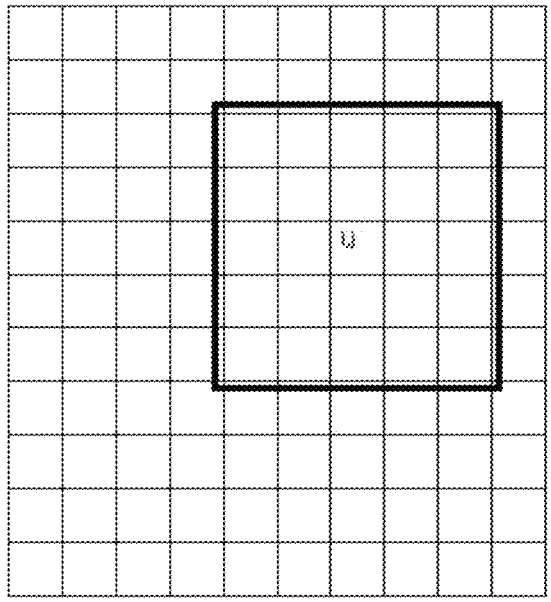
FIG. 4—illustrates a first stage of the sliding window cost computation along columns at the initialization phase.
Figure 4:
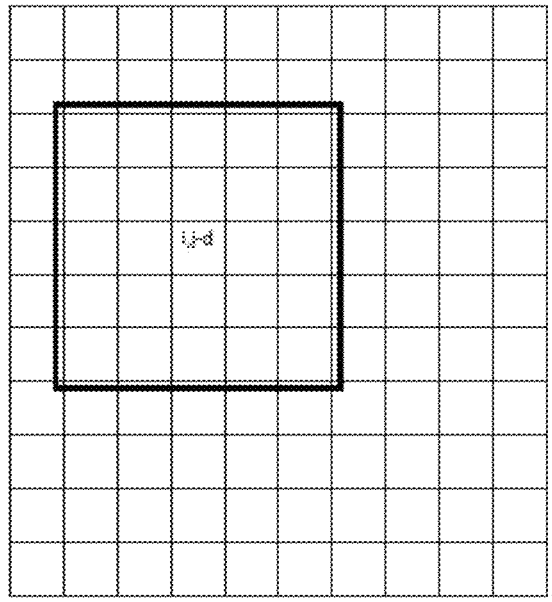

FIG. 4 illustrates a first stage of the sliding window cost computation along columns at the initialization phase. In this Fig., C(i,j,d) designates the cost of matching a window located around pixel (i,j) at the left image to a window to a window located around (i,j−d) at the right image (at disparity d). The cost may be determined in accordance with the sum of absolute difference (hereinafter "SAD"), sum of census costs, and the like.

Figure 5:
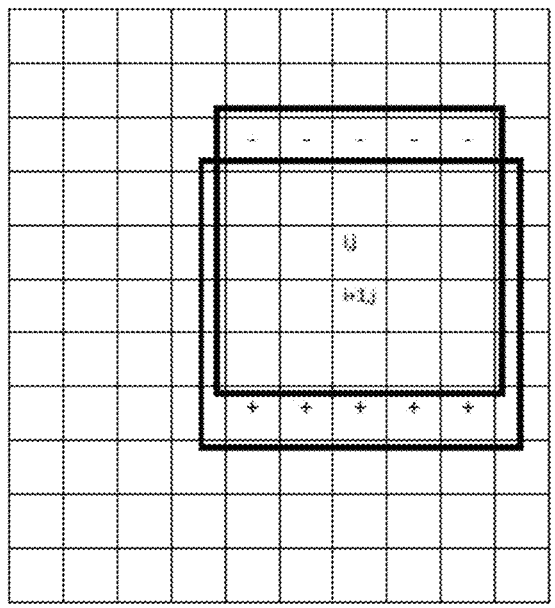
FIG. 5—illustrates a second stage of the sliding window cost computation along columns at the initialization phase.
Figure 5:
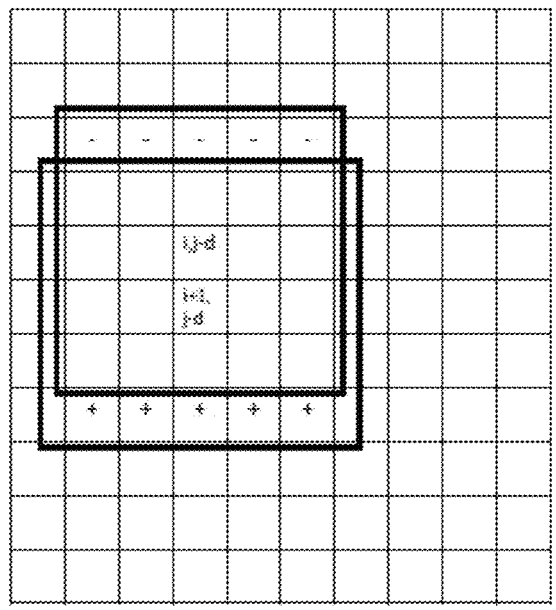

FIG. 5 illustrates a second stage of the sliding window cost computation along columns at the initialization phase. For this stage, we assume that C(i,j,d) has already been calculated, so one may now compute the value of C(i+1, j, d) by subtracting from the value of C (i,j,d) the costs of pixels located at the top row, and adding the costs of pixels located at the bottom row. The cost for the disparity d may then be computed for the entire column.

Figure 6:
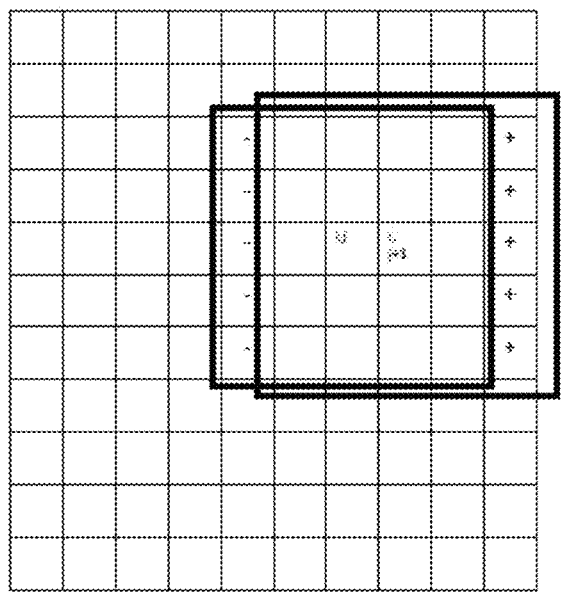
FIG. 6—illustrates a first stage of the sliding window cost computation at the propagation phase.
Figure 6:
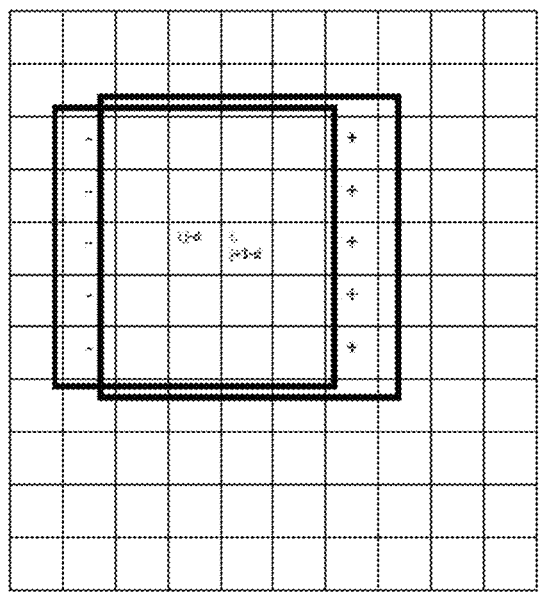

FIG. 6 illustrates a first stage of the sliding window cost computation at the propagation phase. During the propagation phase which follows the initialization phase, the software stereo algorithm performs snake-like passes, where each pixel is associated with two proposed disparity values, one from top or bottom direction and the other from left or right direction.

The costs may be computed efficiently by using the sliding window technique, similarly to the way demonstrated in connection with the initialization phase.

This FIG. demonstrates how is the cost for disparity d is propagated in the rightward direction, namely, from C(i,j,d) to C(i,j+1,d).

Figure 7:
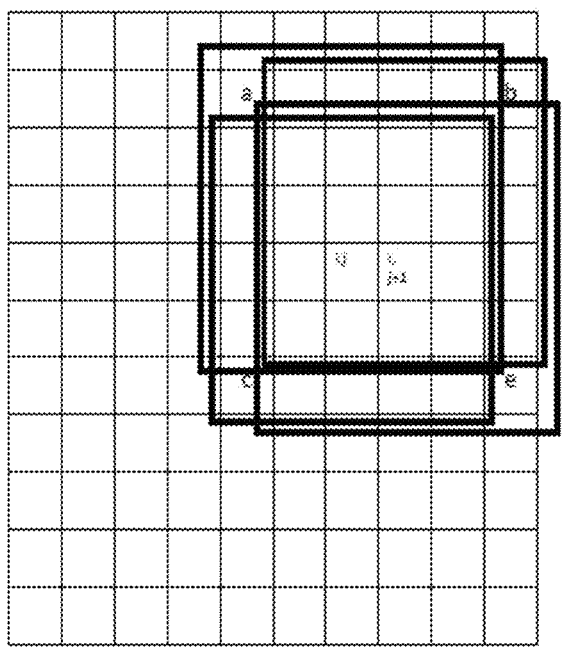
FIG. 7—illustrates a second stage of the sliding window cost computation at the propagation phase.
Figure 7:
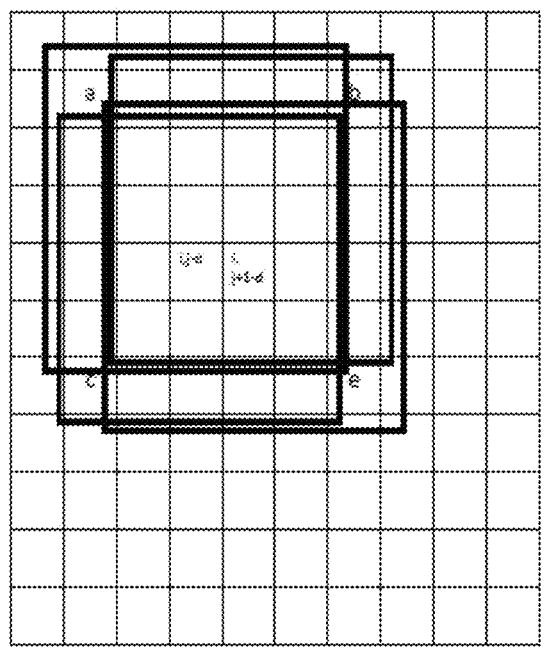

FIG. 7 illustrates a second stage of the sliding window cost computation at the propagation phase. Depending on the architecture and speed of retrieval of the previously computed cost values from memory, it is sometimes faster to compute the cost by using previously stored costs of three windows and costs at four pixels (a, b, c, e):

where $C(i, j+1, d) =$ $$C(i-1, j+1, d) + C(i, j, d) - C(i-1, j, d) + a - b - c + e.$$

After propagation of disparity d to the next pixel in the traversal order, one should check whether the costs at disparities d−1 and d+1 are lower than the current value for that pixel.

If a value one or both of these disparities are stored at the memory, one may examine whether the stored cost has already been previously computed. If in the affirmative, the current computation may be avoided.

The computation may be done in one of a several ways:
  Summation of the costs for the entire window.
  Testing whether the cost for disparities d−1 and d+1 has already been computed for one of the neighbors of the pixel, and use a sliding window as was demonstrated in the preceding figures.

Depth Map Filtering

Figure 3:
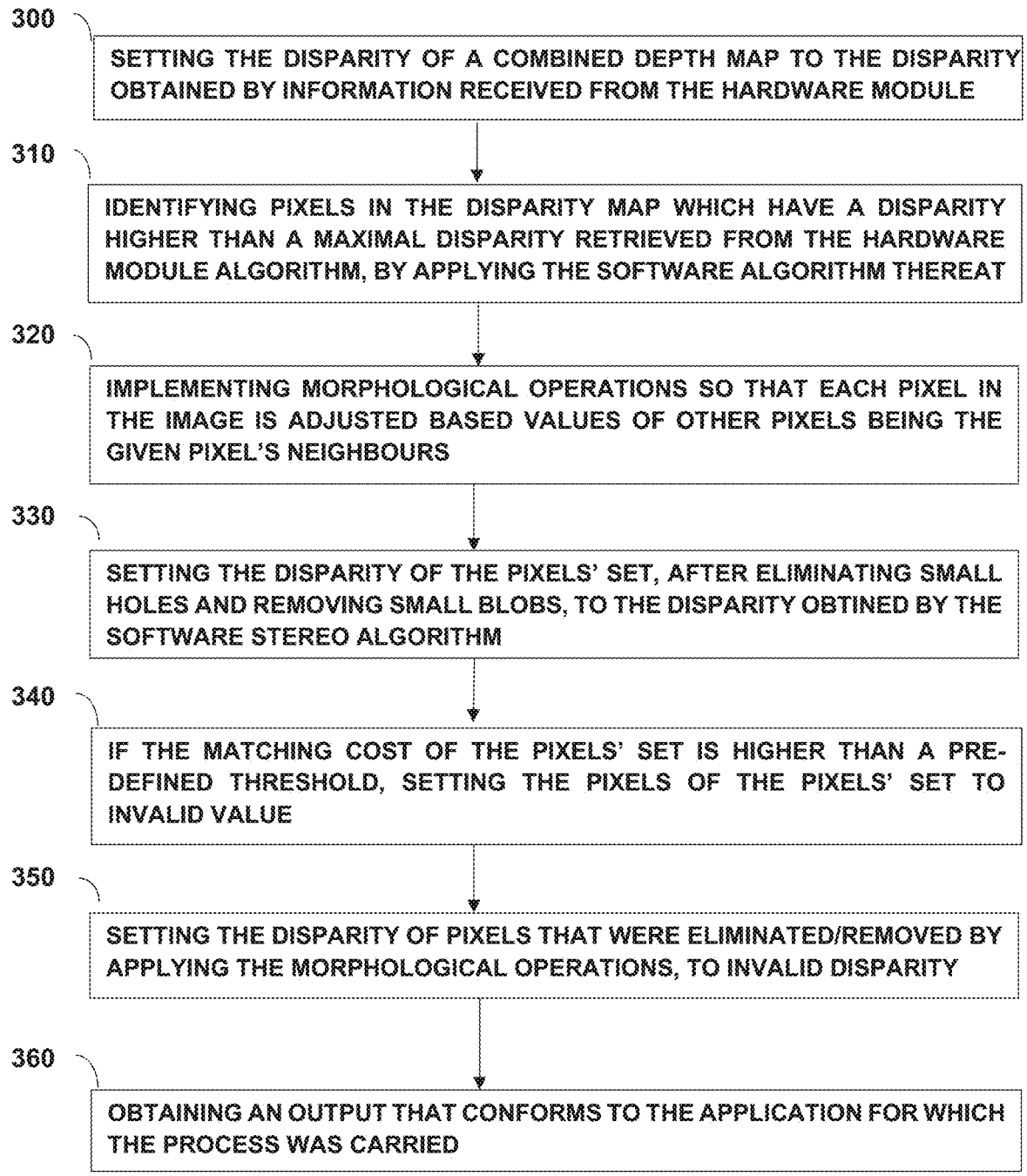
FIG. 3—is a flowchart illustrating an example of generating the combined depth map.

The final phase of the example of the present invention as illustrated in FIG. 3, is, to combine the disparity maps retrieved while processing the information received from the image capturing devices (i.e., hardware module stereo algorithm) to enable detection of the objects included at the distance that is equal to or greater than the pre-defined minimal distance, and received from applying the software stereo algorithm described above to enable detection of the closer objects. An example of generating the combined depth map (i.e., by combining information received from the hardware module stereo algorithm and the software stereo algorithm) is demonstrated in the following description given below.

First, the combined depth map is initialized to the disparity from processing the information received from the image capturing devices (i.e., the hardware module stereo algorithm) (step 300).

Next, pixels in the disparity map retrieved from applying the software stereo algorithm, which have a disparity higher than a maximal disparity of the hardware module stereo algorithm, are identified (step 310).

The combined depth map is further processed by implementing morphological operations thereat (step 320), so that each pixel in the image is adjusted based on the value of other pixels found in the image in the given pixel's neighborhood, to eliminate small holes and remove small blobs.

The disparity of the pixels' set after eliminating the small holes and the removal of the small blobs, is set to the disparity obtained from the software stereo algorithm (step 330).

If the matching cost of the pixels set in step 330 is higher than a pre-defined threshold, their disparity is set to invalid value (step 340).

Then, the disparity of the pixels that were eliminated/removed by applying the morphological operations is set to invalid disparity (step 350). In other words, the solution provided herein comprises fixing the flying pixels in the output disparity provided by the hardware module stereo algorithm, setting disparities associated with distances less than the minimal distance to be invalid, and combine the results obtained with the disparity results obtained by using the hardware module stereo algorithm. The disparity values obtained for distances equal to or greater than the minimum distance are not set to invalid. Also, the disparity of pixels that belong to small blobs of pixels surrounded by pixels with disparity above the maximum disparity received from the hardware module stereo algorithm is set to invalid disparity.

Finally, depending on the application of interest, the output of the phase of generating the combined depth map, may include the combined disparity map, the map truncated to match the disparity range of the hardware module stereo algorithm (i.e., filtering the "flying pixels"), and/or a warning indication if a large number of close pixels is detected by the software stereo algorithm, either for the entire image or per pre-determined image regions (step 360).

FIGS. 8A to 8D demonstrate an example for filtering an input image by the method proposed by the present invention.

Figure 8A:
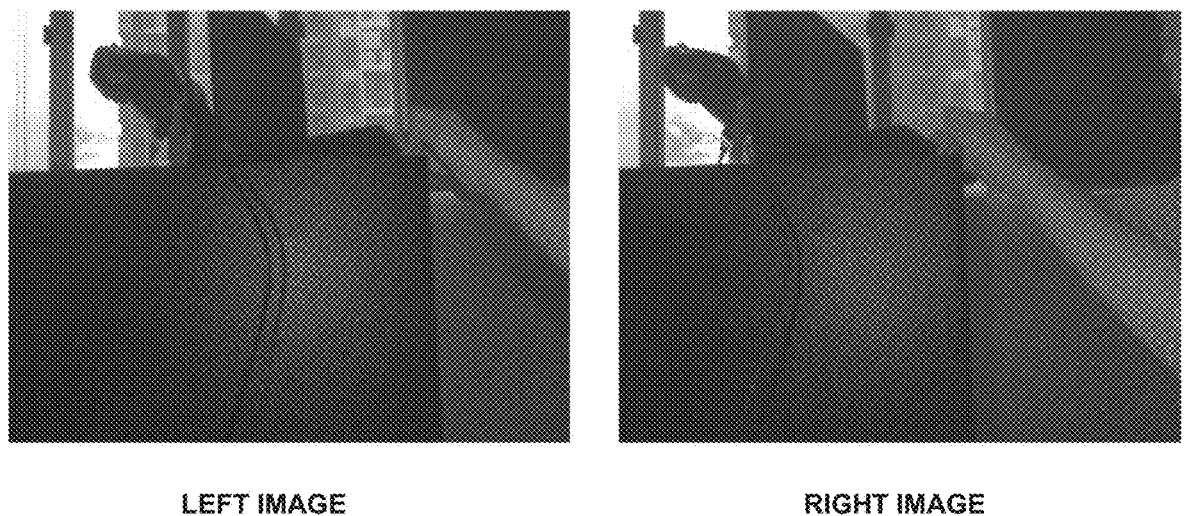
FIGS. 8A to 8D demonstrate an example for filtering an input image by the method proposed by the present invention, wherein FIG. 8A demonstrates the input image that comprises close objects, FIG. 8B demonstrates the disparity image obtained by using the hardware module stereo algorithm.

FIG. 8A demonstrates the input image that comprises close objects.

Figure 8B:
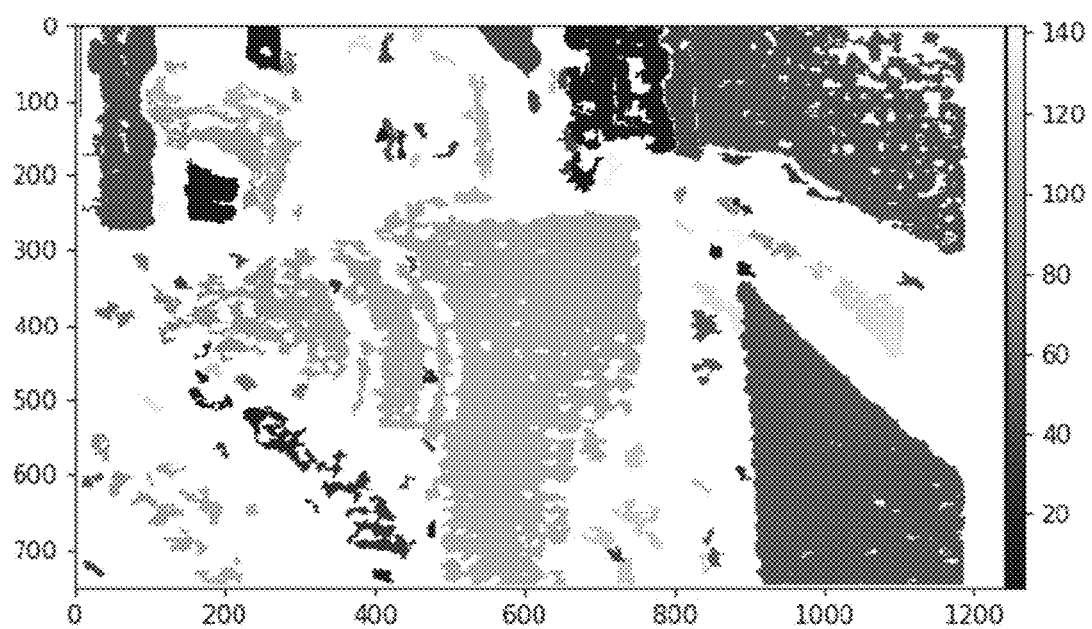

FIG. 8B demonstrates the disparity image that was computed by using the hard module stereo algorithm limited to a 144 pixels disparity.

It should be noted that the "flying pixels" present in this FIG. result from false matches at the close regions, and that the large gray region in the center of the image is at incorrect disparity (around 100).

Figure 8C:
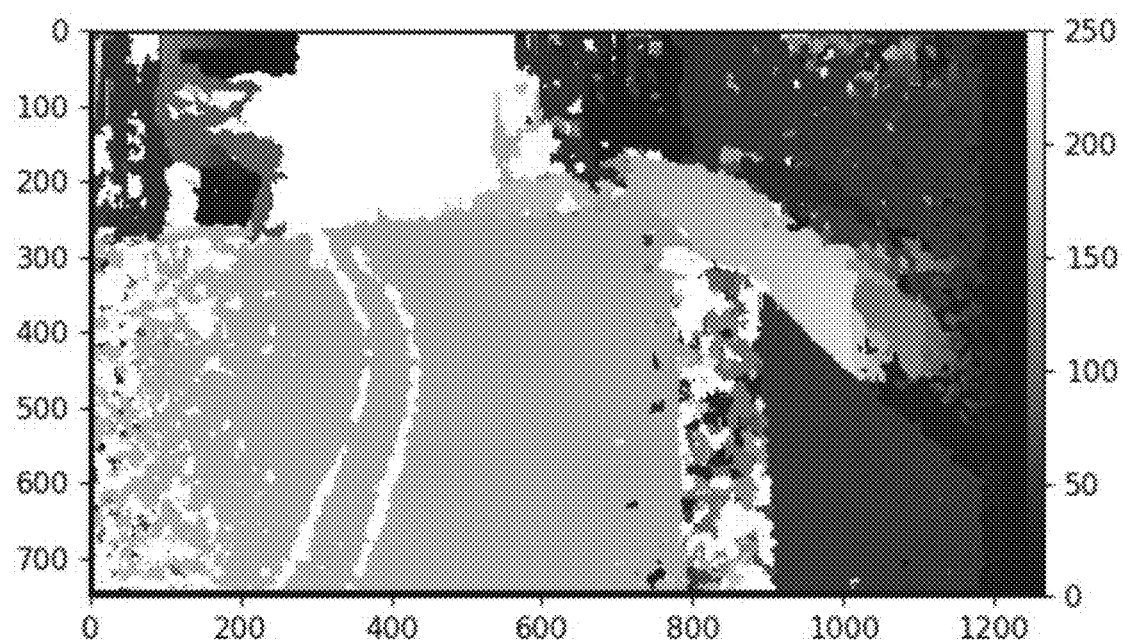

FIG. 8C illustrates the disparity image obtained by using the software stereo algorithm. In this FIG. the disparity image was computed using a software stereo algorithm having an unlimited disparity range. While this algorithm is a probabilistic algorithm that provides no guarantee for the results obtained, the software stereo algorithm was able to detect correctly the close screen object at the center (at a disparity value of about 175).

Figure 8D:
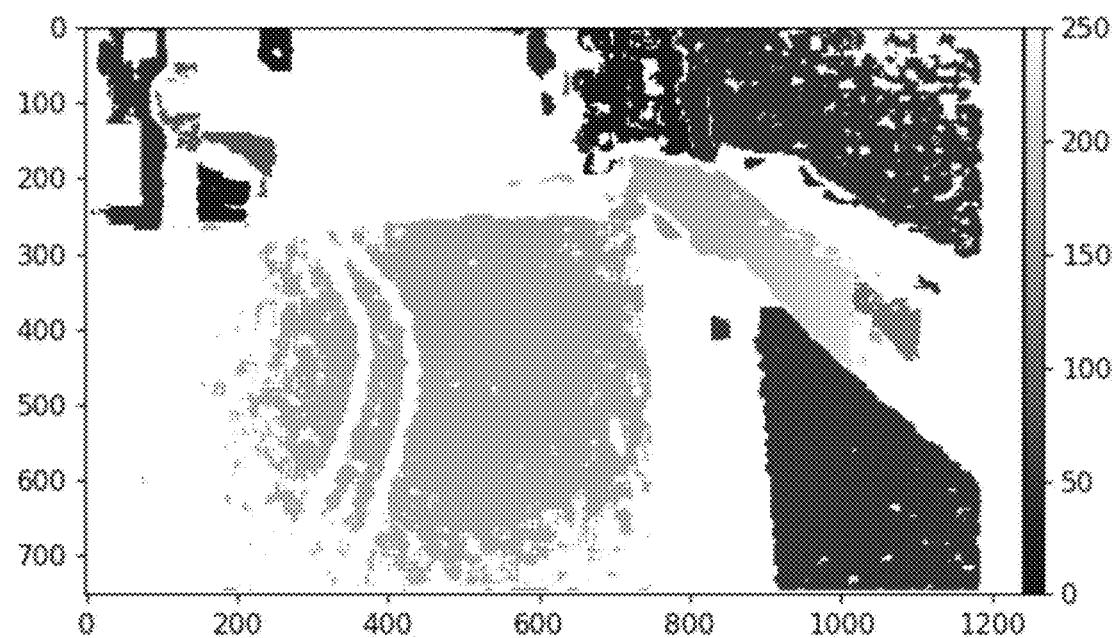

FIG. 8D demonstrates the overall result obtained by combining the output of the hardware module stereo algorithm with the output of the software stereo algorithm. The result shown in this FIG. is a possible combination of the output hardware and software disparity maps, taken together with a possible filtering of small blobs.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the apparatus may include a cameras' array that has two or more cameras, such as, for example, video cameras to capture two or more video streams of the target. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for use in a stereoscopic image generating system, wherein the image generating system comprises a hardware module that is associated with at least one pair of image capturing devices, at least one memory means and at least one processor, wherein information retrieved from the capturing devices is processed by the at least one processor, which is configured to implement a hardware module stereo algorithm for identifying objects included in the captured scene at a distance that is equal to or greater than a minimal distance defined by geometry and disparity range of said hardware module, wherein the at least one processor is further configured to implement a software stereo algorithm adapted to detect objects included in the captured scene at a distance that is less than the minimal distance required for identifying objects by the hardware module stereo algorithm, wherein said method comprises an initialization phase that comprises the steps of:

(i) receiving at least one pair of images from said two image capturing devices, storing information derived from the received images by columns and rows and retrieving information contained in pixels comprised in said rows/columns;

(ii) assigning a small set of initial random disparities to each of said columns, wherein the same set of initial random disparities is assigned to all pixels that belong to a single column;

(iii) selecting a small set of random disparities from among random permutations, in a way that creates a generally uniform coverage and determining a permutation index i for column c by using a relationship i=P[c mod S], where S is the permutation size and P is a random permutation of the numbers 0, . . . , S−1, and disparity samples for said column c are: i, i+S, i+2S, . . . until the edge of the image is reached;

(iv) computing matching costs for each pixel located at the first row of the captured image for its initial set of random disparities, wherein the disparity that corresponds the lowest score is stored at said at least one memory means; and (v) completing the computation for all image rows included in the captured image.

2. The method of claim 1, wherein said method is further configured to generate a combined depth map based on combining the objects located at a distance that is equal to or greater than said minimal distance that are identifiable by the hardware module stereo algorithm, and objects located at a distance that is less than said minimal distance that are identifiable by the software stereo algorithm.

3. The method of claim 1, wherein said method is further configured to generate an indication upon identifying objects included within the captured scene at a distance that is less than said minimal distance.

4. The method of claim 1, wherein said method is further configured to eliminate from information received from the image capturing devices, values of pixels associated with objects that are located within the captured scene at a distance that is less than said minimal distance.

5. The method of claim 1, wherein said hardware module stereo algorithm is configured to scan a full range of disparities, ensuring that all objects located within the scene at a distance that is equal to or greater than said minimal distance, are detected.

6. The method of claim 5, wherein said software stereo algorithm is configured to identify objects which are located at a distance less than the minimal distance, which are not detectable by the hardware module scan.

7. The method of claim 1, wherein the software stereo algorithm is configured to detect distance at which objects are located by using the hardware module and/or the pair of image capturing devices, wherein in case that said distance is equal to or greater than the minimal distance, depth results will be determined by using the results obtained by the hardware module stereo algorithm, and in case that the detected distance is less than the minimal distance, the depth results will be determined by using the results obtained by the software stereo algorithm.

8. The method of claim 1, comprises a phase of calculating lowest-found cost and best-found disparity, wherein said phase comprises the steps of:
   1) Making a number of passes over the image in order to update for each pixel its best-found disparity with a respective lowest-found cost in order to update for each pixel its best-found disparity with a respective lowest found cost;
   2) For each pass, comparing the cost of each given pixel's current best disparity with two proposed disparities, one of which is a disparity of said given pixel row's neighbor whereas the other is that of its column's neighbor; and
   3) Evaluating the cost of disparities d+1 and d−1, where d is current disparity having lowest cost, and updating the current best disparity and current lowest cost if the cost is smaller than the current best cost of a given pixel.

9. The method of claim 8, comprising a phase of combining disparity maps retrieved while processing information received from the image capturing devices to enable detection of objects included in the captured scene at the distance that is equal to or greater than the pre-defined minimal distance and information received from applying the software stereo algorithm to enable detection of closer objects, wherein said phase comprises the steps of:
   (a) initializing a combined depth map of the disparity obtained from processing information received from the image capturing devices;
   (b) identifying pixels in said combined depth map derived from the output of said software stereo algorithm, wherein the identified pixels have a disparity higher than a maximal disparity of the hardware software module algorithm;
   (c) implementing morphological operations onto said combined depth map, so that each pixel in the image is adjusted based on values of other pixels located at its neighborhood, to eliminate small holes and remove small blobs from the captured image being processed;
   (d) after eliminating the small holes and the removal of the small blobs, setting the disparity of the image pixels to the disparity obtained from the software stereo algorithm;
   (e) if the matching cost of the pixels set in step (d) is higher than a pre-defined threshold, their disparity is set to an invalid value;
   (f) setting the disparity of pixels that were eliminated/removed by applying said morphological operations, to an invalid disparity; and
   (g) generating a combined depth map.

10. The method of claim 9, wherein the combined depth map is applied as a full combined disparity map, or applied as a truncated map that matches a disparity range of the hardware module's algorithm, or applied for generating an indication if a large number of close pixels is detected by the software stereo algorithm.

11. The method of claim 1, adapted for use in robotics field of technology.

* * * * *